United States Patent
Hirasawa et al.

(10) Patent No.: US 10,809,144 B2
(45) Date of Patent: Oct. 20, 2020

(54) PHYSICAL QUANTITY SENSOR AND METHOD FOR MANUFACTURING SAME

(71) Applicant: DENSO CORPORATION, Kariya, Aichi-pref. (JP)

(72) Inventors: Kazuya Hirasawa, Kariya (JP); Takuya Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 16/080,410

(22) PCT Filed: Apr. 6, 2017

(86) PCT No.: PCT/JP2017/014408
§ 371 (c)(1),
(2) Date: Aug. 28, 2018

(87) PCT Pub. No.: WO2017/187926
PCT Pub. Date: Nov. 2, 2017

(65) Prior Publication Data
US 2019/0078955 A1  Mar. 14, 2019

(30) Foreign Application Priority Data

Apr. 26, 2016 (JP) .................. 2016-088350

(51) Int. Cl.
*G01L 19/14* (2006.01)
*G01L 19/00* (2006.01)

(52) U.S. Cl.
CPC ........ *G01L 19/142* (2013.01); *G01L 19/0061* (2013.01); *G01L 19/14* (2013.01); *G01L 19/147* (2013.01); *G01L 19/148* (2013.01)

(58) Field of Classification Search
CPC ..... G01L 19/142; G01L 19/14; G01L 19/148; G01L 19/147
See application file for complete search history.

(56) References Cited

U.S. PATENT DOCUMENTS

| 5,747,694 | A | 5/1998 | Baba et al. | |
|---|---|---|---|---|
| 5,900,554 | A | 5/1999 | Baba et al. | |
| 6,521,966 | B1 * | 2/2003 | Ishio | G01L 19/147 257/417 |
| 6,601,453 | B2 * | 8/2003 | Miyazaki | G01L 19/0038 73/753 |
| 6,651,508 | B2 * | 11/2003 | Baba | G01L 19/0084 73/700 |

(Continued)

FOREIGN PATENT DOCUMENTS

| JP | 2002-098609 A | 4/2002 |
|---|---|---|
| JP | 2006-208087 A | 8/2006 |

(Continued)

*Primary Examiner* — Jamel E Williams
(74) *Attorney, Agent, or Firm* — Posz Law Group, PLC (57) ABSTRACT

Instead of insert molding a mold member with a resin case to integrate it, a filler is filled into a first opening formed in the resin case while the mold member is disposed therein, whereby integration is performed. This makes it possible to suppress peeling between the mold member and the resin case due to a thermal cycle, and also makes it possible to suppress leakage of a measurement medium to the outside through a gap between the mold member and the resin case.

8 Claims, 6 Drawing Sheets

(56) References Cited

U.S. PATENT DOCUMENTS

| | | | | |
|---|---|---|---|---|
| 6,718,829 B2* | 4/2004 | Baba | ................. | B01D 46/0086 |
| | | | | 73/721 |
| 6,807,864 B2* | 10/2004 | Takakuwa | ........... | G01L 19/0038 |
| | | | | 73/700 |
| 7,152,480 B2* | 12/2006 | Nomura | .............. | G01L 19/0038 |
| | | | | 73/716 |
| 7,412,895 B2* | 8/2008 | Asada | ................. | G01L 19/0084 |
| | | | | 73/706 |
| 9,772,242 B2* | 9/2017 | Kobayashi | ............ | G01L 9/0041 |
| 9,789,637 B2* | 10/2017 | Izumi | ................. | B29C 45/1671 |
| 9,863,828 B2* | 1/2018 | Imai | ........................ | G01C 5/06 |
| 10,422,710 B2* | 9/2019 | Kishimoto | .............. | G01L 9/045 |
| 2010/0223995 A1* | 9/2010 | Watanabe | ........... | G01D 11/245 |
| | | | | 73/431 |
| 2016/0209284 A1* | 7/2016 | Takayama | ........... | H01L 23/4952 |
| 2017/0197820 A1* | 7/2017 | Naruse | ................. | B81B 7/0048 |
| 2019/0107457 A1* | 4/2019 | Soshino | ............. | G01L 19/0092 |

FOREIGN PATENT DOCUMENTS

| | | | |
|---|---|---|---|
| JP | 2015021865 A | * | 2/2015 |
| JP | 2015-148511 A | | 8/2015 |

\* cited by examiner

PHYSICAL QUANTITY SENSOR AND METHOD FOR MANUFACTURING SAME

CROSS REFERENCE TO RELATED APPLICATIONS

The present application is a U.S. national phase of International Application No. PCT/JP2017/014408 filed on Apr. 6, 2017 and is based on Japanese Patent Application No. 2016-88350 filed on Apr. 26, 2016, the disclosures of which are incorporated herein by reference.

TECHNICAL FIELD

The present disclosure relates to a physical quantity sensor for detecting a physical quantity such as pressure, flow rate or humidity of a measurement medium and a manufacturing method thereof, and is particularly suitable for application to a pressure sensor that performs pressure detection when a liquid is used as a measurement medium.

BACKGROUND ART

Conventionally, in Patent Document 1, a pressure sensor has an integrated circuit in which a sensor chip is molded by resin sealing (hereinafter referred to as mold IC (abbreviation of Integrated Circuit)), and a connector case which seals the mold IC with resin.

In the pressure sensor, in order to suppress a leakage of the measurement medium to the outside due to the intrusion of the measurement medium into the gap between the mold IC and the connector case, the configuration for preventing generation of a gap between the mold IC and the connector case is provided. Specifically, in the pressure sensor, a pressure seal portion is provided so as to protrude along an outer wall surface of the mold IC on a side of the mold IC of the connector case. Since the pressure seal portion is provided, the pressure seal portion receives the pressure of the measurement medium in the direction perpendicular to the outer wall surface of the mold IC and is pressed toward the mold IC side. This pressing force makes it difficult for a gap to be formed between the connector case and the mold IC in the pressure seal portion, and it is possible to suppress the measurement medium from entering between the connector case and the mold IC.

PRIOR ART LITERATURES

Patent Document 1: Japanese Patent Publication 2015-148511

SUMMARY OF INVENTION

In the pressure sensor having the structure shown in Patent Document 1, since the molded resin in the mold IC is covered by the connector case so as to be sealed with the resin, a peeling due to the difference in the coefficient of linear expansion between the molded resin and the resin constituting the connector case occurs. That is, when the thermal cycle is repeated, a thermal stress due to the difference in coefficient of linear expansion is applied between the molded resin and the connector case, and the peeling occurs between them. As a result of the peeling, a gap is formed between the connector case and the mold IC, and there is concern that an external leakage of the measurement medium may occur through the gap.

Although a pressure sensor is taken as an example of the physical quantity sensor here, physical quantity sensors for detecting the physical quantity of the measuring medium, for example, an air flow sensor and a humidity sensor for detecting the flow rate and the humidity of the measuring medium have a similar problem.

It is therefore an object of the present disclosure to provide a physical quantity sensor and a manufacturing method thereof capable of suppressing leakage of the measurement medium to the outside through the gap between the connector case and the mold member molded with the sensor chip.

A physical quantity sensor according to one aspect of the present disclosure includes a connector case having a terminal made of a conductive material and a resin case, and a mold member. The resin case has a first opening formed on one surface and a second opening exposing a part of the terminal while communicating with the first opening, and the resin case is integrated with the terminal. The mold member includes a sensor chip provided with a sensor element that detects a physical quantity, a lead portion being electrically connected to the sensor chip, and being connected to the terminal at the second opening, and a mold resin configured to cover the lead portion and the sensor chip in a state that a part of the lead portion and a part of the sensor chip are exposed, so that at least part of the lead portion and the mold resin is disposed at the first opening. A first filler is filled between the resin case and the mold resin in the first opening, and a second filler is filled in the second opening.

In the physical quantity sensor as describe above, the mold member is not integrated so as to be insert molded to the resin case. However, the mold member is disposed in the first opening formed in the resin case, and is integrated by filling the first filler. Therefore, it is possible to suppress the peeling between the mold member and the resin case due to the thermal cycle, and it is possible to suppress the leakage of the measurement medium to the outside through the gap between the mold member and the resin case.

In a method of manufacturing a physical quantity sensor according to another aspect of the present disclosure, first, a connector case including a terminal made of a conductive material and a resin case which has a first opening formed on one surface, a second opening exposing a part of the terminal while communicating with the first opening, and a resin case being integrated with the terminal is provided. A connector case including a terminal made of a conductive material and a resin case which has a first opening formed on one surface, a second opening exposing a part of the terminal while communicating with the first opening, and a resin case being integrated with the terminal is provided. A mold member including a sensor chip provided with a sensor element that detects a physical quantity, a lead portion being electrically connected to the sensor chip, and being connected to the terminal at the second opening, and a mold resin configured to cover the lead portion and the sensor chip in a state that a part of the lead portion and a part of the sensor chip are exposed are provided. At least part of the lead portion and the mold resin at the first opening is disposed. The terminal and the lead portion through the second opening are connected. A first filler between the resin case and the mold resin in the first opening is filled. The terminal and the lead portion are connected, and a second filler through the second opening is filled, after the first filler is filled.

In the case where the first filler is filled in this way, since the first opening communicates with the second opening and the first opening is not a sealed space, the first filler can be easily filled. In addition, even if air bubbles are present in the first filler, it can be made to escape from the second opening side. Therefore, it is unnecessary to perform vacuum defoaming for removing air bubbles after filling with the first filler, and the productivity can be increased.

EMBODIMENTS FOR CARRYING OUT INVENTION

Hereinafter, a plurality of embodiments will be described based on the drawings. In a plurality of embodiments below, substantially the same configurations will be denoted with the same reference sign.

First Embodiment

The first embodiment will be described with reference to the drawings. In the present embodiment, a pressure sensor will be described as an example of a physical quantity sensor. The pressure sensor of the present embodiment is preferably mounted on an automobile engine as an attachment member, for example, and is used for detecting the pressure in the combustion chamber of the engine.

Figure 1:
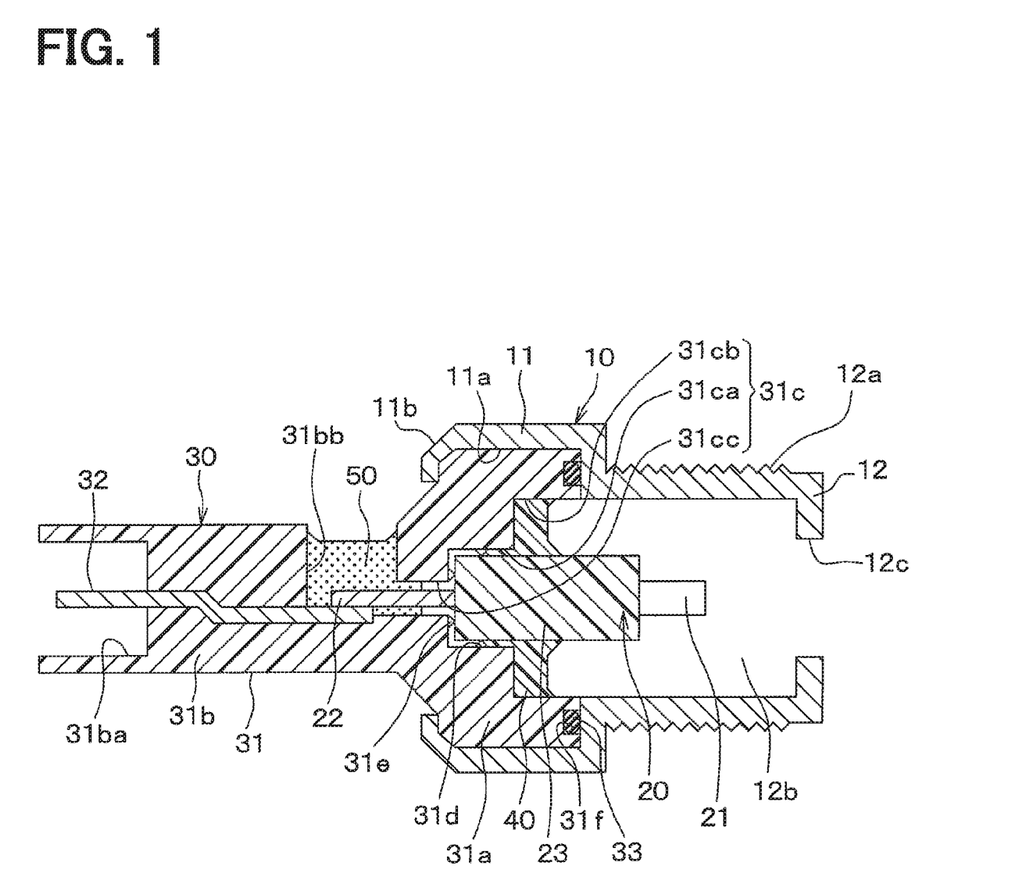
FIG. 1 is a diagram of a cross sectional view of a pressure sensor in a first embodiment.

As shown in FIG. 1, the pressure sensor includes a cylindrical housing 10 having a hollow portion with both ends opened. The housing 10 is made of a metal such as SUS 630, for example.

The housing 10 of the present embodiment has a main body portion 11 and a pipe portion 12 which are formed in a hollow cylindrical shape. The housing has a stepped cylindrical shape in which the inner circumference dimension and the outer circumference dimension are changed by means of the main body portion 11 and the pipe portion 12, and has a structure in which a center line is a central axis and both ends thereof are opened.

The main body portion 11 has a configuration constituting the accommodation recess 11a into which the connector case 30 and the like described later are fitted, and the inner circumferential dimension and the outer circumferential dimension of the main body portion 11 are larger than the pipe portion 12. An axial dimension of the main body portion 11 is larger than a dimension in the same direction of a part fitted in the accommodation recess 11a of the connector case 30. One end 11b of the main body portion 11 in the lengthened part is caulked inside such that the connector case 30 and the like are fixed.

Further, the main body portion 11 has, for example, a hexagonal outer peripheral wall, and it is also used as a part into which the hexagonal wrench is fitted when the pressure sensor is fixed to the attached member. The inner peripheral surface of the main body portion 11 has a circular shape, and a part of the connector case 30 is inserted along the inner peripheral surface. The inner circumferential dimension of the main body portion 11 is the inner diameter of the inner circumferential surface, and the outer circumferential dimension is a dimension passing through the central axis of the main body portion 11. For example, in a case that the outer circumferential wall has a hexagonal shape as described above, the above dimension is a length of the diagonal line.

The pipe portion 12 is a cylindrical member having a threaded groove 12a formed on the outer peripheral wall thereof and constitutes a fixing portion for fixing the pressure sensor to the attached member by being screwed to the attached member. In addition, a hollow portion of the pipe portion 12 constitutes a pressure introduction chamber 12b into which a pressure measurement medium is introduced. Specifically, an opening 12c is provided at the tip of the pipe portion 12 on a side opposite to the main body portion 11, and the measurement medium is introduced through the opening portion 12c as the inlet portion of the pressure introduction chamber 12b.

In addition, the pressure sensor is provided with a mold member 20, a connector case 30, and the like, which are inserted into the main body portion 11 of the housing 10 in a state of being integrated, and are fixed to the housing 10, whereby the pressure sensor is configured.

In the mold member 20, a sensor chip 21 and a lead portion 22 are sealed with a mold resin 23, and the sensor chip 21 and the lead portion 22 are insert-molded.

The sensor chip 21 has a sensor element for detecting a physical quantity, in the present embodiment, a pressure sensing element for detecting a pressure, which are formed, by means of, for example, applying a semiconductor process to a silicon substrate. On the sensor chip 21, for example, a diaphragm having a strain gauge for pressure detection formed therein, and a control circuit for applying a voltage for the detection to the strain gauge, and performing signal processing of a detection signal from the strain gauge, etc. are provided. One end of the sensor chip 21 on a side on which the diaphragm is formed is exposed from the mold resin 23, and is disposed in the pressure introduction chamber 12b. Therefore, the pressure of the measurement medium introduced into the housing 10 is applied to one end of the sensor chip 21.

The lead portion 22 is electrically connected to a pad portion (not shown) of the sensor chip 21 in the mold resin 23 by wire bonding or the like. As a result, voltage application to the sensor chip 21, connection to the ground potential point, and output of a detection signal after a signal processing, and the like can be performed by means of the lead portion 22. Although only one lead portion 22 is shown in the figure, a plurality of lead portions 22 are provided, and a plurality of lead portions 22 are arranged side by side in the direction perpendicular to the paper surface of FIG. 1. Each lead portion 22 in the mold resin 23 is exposed at a position on the opposite side of the position of the mold resin 23 from which the sensor chip 21 is exposed. The lead portion 22 is made of a metal having excellent conductivity such as Cu (copper) or 42 alloy and so on, and is processed into a predetermined shape by an etching processing, a press working or the like.

The mold resin 23 is formed by a resin molding using a mold, for example. For example, the mold resin 23 is made of an epoxy resin or the like, and is molded by a transfer mold method using a metal mold or the like. When the mold resin 23 is made of an epoxy resin, for example, an epoxy resin having a linear expansion coefficient of 14 to 15 ppm is used. The mold resin 23 performs protection of a portion performing electrical connection between the sensor chip 21 and the lead portion 22, protection of a circuit element formed on the sensor chip, and the like, and has a rectangular parallelepiped shape, for example. A part of the sensor chip 21 is exposed from one end in the longitudinal direction of the rectangular parallelepiped shaped mold resin 23, and the lead portion 22 is exposed from the other end.

The connector case 30 is formed such that the terminal 32 connected to the lead portion 22 is insert-molded in the resin case 31.

The resin case 31 has a cylindrical body portion 31a and a connector portion 31b extending from the body portion 31a to the side opposite to the pressure introduction chamber 12b. The resin case 31 is made by molding a thermoplastic resin such as, for example, PPS (abbreviation of polyphenylene sulfide) or PBT (abbreviation of polybutylene terephthalate), and the body portion 31a and the connector portion 31b are integrated. For example, when the resin case 31 is made of PPS, the coefficient of linear expansion is about 20 to 25 ppm although it varies depending on the flowing direction of the resin at the time of molding the resin case 31 with resin.

The body portion 31a is a cylindrical shaped portion fitted in the main body portion 11 in the housing 10, and the outer diameter is a substantially same to an inner diameter of the main body portion 11. A first opening 31c is formed on one surface of the body portion 31a of the resin case 31, specifically on the end surface on a side of the pressure introduction chamber 12b in the body portion 31a, and the mold member 20 is disposed in the first opening 31c. The first opening 31c extends from an end surface on the side of the pressure introduction chamber 12b to a side of the connector portion 31b along the central axis of the body portion 31a, and extends to the outside of the accommodation recess 11a formed in the main body portion 11.

The first opening 31c is composed of an intermediate portion 31ca where the mold member 20 is fitted, an inlet portion 31cb that is closer to the pressure introduction chamber 12b than the intermediate portion 31ca, and a back portion 31cc which is the opposite side to the pressure introduction chamber 12b. The inlet portion 31cb has a larger opening size than the intermediate portion 31ca, and the opening dimension of the back portion 31cc is smaller than that of the intermediate portion 31ca. The inlet portion 31cb is opened, for example, in a cylindrical shape. The intermediate portion 31ca has a shape corresponding to the outer shape of the mold member 20, for example, a quadrangular prism shape. The back portion 31cc is dimensioned such that the lead portion 22 can be inserted and is dimensioned to stop insertion of the mold member 20.

On the inner wall surface of the intermediate portion 31ca of the first opening portion 31c, that is, on the side wall surface, a protrusion portion 31d is provided for positioning the mold member 20 by being brought into contact with the outer wall surface of the mold member 20. Although the shape of the protrusion portion 31d is arbitrary, for example, the protrusion portion 31d is scattered over one round so as to surround the center axis of the body portion 31a so that a gap is provided between the protrusion portions 31d.

A protrusion portion 31e is also formed in a stepped portion which is a boundary portion between the intermediate portion 31ca and the back portion 31cc. The tip end surface of the mold member 20 on the side of the lead portion 22 is brought into contact with the protrusion portion 31e to position the mold member 20 in the central axis direction of the body portion 31a. The shape of the protrusion portion 31e is also arbitrary, but it is scattered over one round, for example, so as to surround the central axis of the body portion 31a so that a gap is provided between the protrusion portions 31d.

An annular groove portion 31f surrounding the periphery of the first opening 31c is formed on a distal end surface of the body portion 31a on the side opposite to the connector portion 31b, and an O-ring 33 is disposed in the groove portion 31f. The O-ring 33 suppresses the leakage of the measurement medium through the gap between the inner wall surface of the housing 10 and the body portion 31a.

The connector portion 31b is constituted by a cylindrical member whose outer diameter is smaller than that of the body portion 31a, and is arranged outside of the housing 10. In the present embodiment, the central axis of the connector portion 31b is coaxial with the central axis of the body portion 31a.

The terminal 32 is integrated with the connector portion 31b by insert molding. A concave portion 31ba is formed on an end surface of the connector portion 31b on the side opposite to the body portion 31a, and one end of the terminal 32 is exposed in the concave portion 31ba. An external connector for electrical connection with the pressure sensor is inserted into the concave portion 31ba such that the terminal 32 as a connection terminal can be electrically connected to the outside.

A second opening 31bb is recessed toward the central axis from the side surface of the connector portion 31b, and is formed on the side of the body portion 31a of the side surface of the connector portion 31b with respect to the concave portion 31ba. The second opening 31bb communicates with the back portion 31cc of the first opening 31c so as to expose the tip portion of the lead portion 22 inserted into the first opening portion 31c and to expose the distal end portion of the lead portion 22 inserted in the first opening 31c. In this second opening 31bb, the terminal 32 and the lead portion 22 are overlapped and are physically and electrically connected by welding, for example.

The terminal 32 is constituted by a conductor material, for example, a linear member made of metal, and a plurality of terminals 32 are provided so as to be separated from each other. The terminal 32 is integrated with the resin case 31 by insert molding and is held in the resin case 31. Each terminal 32 is electrically connected to each of the lead portions 22 as described above. Therefore, when the external connector is connected to the terminal 32, the voltage application to the sensor chip 21, the connection to the ground potential point, and the output of the detection signal after the signal processing, etc. can be performed through the lead portions 22.

Further, in the first opening 31c, for example, a filler 40 corresponding to a first filler made of an insulating material is filled from the inlet portion 31cb to a midway portion of the intermediate portion 31ca. The filler 40 is brought into close contact with the mold resin 23 and the resin case 31.

Regarding the constituent material of the filler 40, it is necessary to be a material capable of suppressing the leakage of the external pressure of the measurement medium, and if the measurement medium is a high pressure liquid, the strength is also required. Therefore, the filler 40 is made of, for example, a thermosetting resin.

More preferably, the constituent material of the filler 40 is preferably a material whose linear expansion coefficient is a value similar to the linear expansion coefficient of the mold resin 23. In consideration of the above constituent material, for example, it is preferable that the filler 40 is made of thermosetting epoxy or the like. The linear expansion coefficient of the thermosetting epoxy is, for example, 10 to 18 ppm. The mold resin 23 exemplified in the present embodiment is made of an epoxy resin, the coefficient of linear expansion is, for example, 10 to 18 ppm, the resin case 31 is made of PPS, the coefficient of linear expansion is, for example, 22 to 30 ppm. By constructing the filler 40 using such a material having a linear expansion coefficient, it is possible to reduce the thermal stress due to the difference in linear expansion coefficient between the filler 40 and the mold resin 23. In addition, due to the stress relaxation effect derived from the shape of the filler 40, the thermal stress due to the difference in linear expansion coefficient between the filler 40 and the resin case 31 can also be reduced. Therefore, it is possible to suppress the peeling between these components in the thermal cycle.

The above-mentioned similar value means that the linear expansion coefficient of the filler 40 is close to the coefficient of linear expansion of the mold resin 23, and it is preferable that they have the same coefficient of linear expansion, but different values may be used. The linear expansion coefficient of the filler 40 may be an intermediate value between the linear expansion coefficient of the mold resin 23 and the linear expansion coefficient of the resin case 31.

In addition, a filler 50 corresponding to the second filler is filled in the second opening 31*bb*. Here, the filler 50 is filled so as not to be in contact with the filler 40 and so as to be in a separated state. Since the filler 50 does not touch the measuring medium of pressure, even if the measuring medium is a liquid of high pressure, in the filler 50 the strength that can withstand a liquid of high pressure is not required. However, it is preferable to form the filler 50 with a moisture-proof material having a moisture-proof effect so as to prevent moisture or the like existing outside the pressure sensor from entering the inside. In addition, it is preferable to use a flexible material so that thermal stress can be prevented from occurring between the molding resin 23 and the resin case 31 in the thermal cycle. Alternatively, as a constituent material of the filler 50, it is preferable to use a material whose linear expansion coefficient is an intermediate value between the linear expansion coefficient of the mold resin 23 and the linear expansion coefficient of the resin case 31. Here, silicone resin or the like is used as a constituent material of the filler 50 as a material having flexibility and having a moisture-proof effect.

With the above structure, the pressure sensor according to the present embodiment is configured. As described above, such a pressure sensor is mounted on the engine of the automobile as a member to be mounted by threadedly coupling the thread groove 12*a*, and the pressure sensor is used for detecting the pressure in the combustion chamber of the engine. When a pressure is applied to a diaphragm (not shown) of the sensor chip 21, the resistance value of the strain gauge formed in the diaphragm changes in accordance with the stress, and the detection signal of the strain gauge changes. This detection signal is subjected to signal processing by a control circuit or the like and is output to the outside as a sensor output through the lead portions 22 and the terminal 32. Thus, the pressure of the measurement medium can be detected.

Next, a method of manufacturing the pressure sensor will be described with reference to FIGS. 2A to 2F.

Figure 2A:
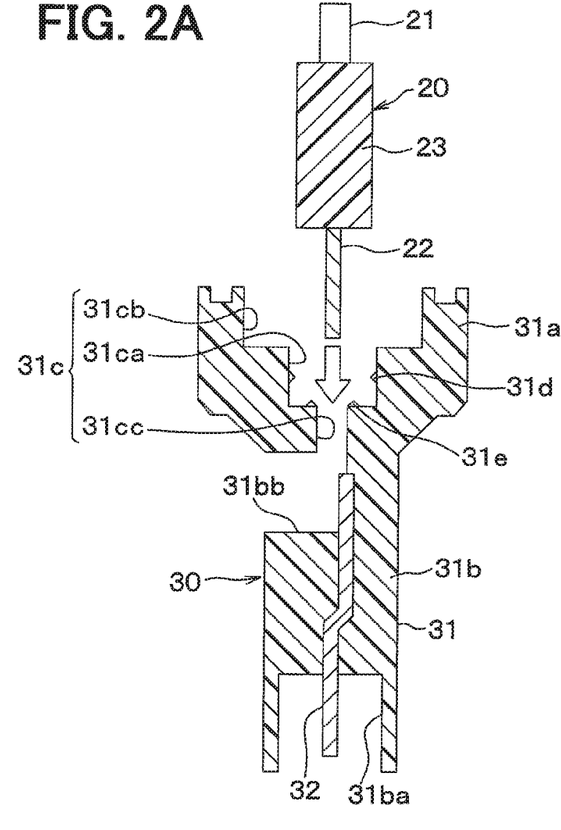
FIG. 2A is a diagram of a cross sectional view illustrating a manufacturing process of the pressure sensor in FIG. 1.
Figure 2B:
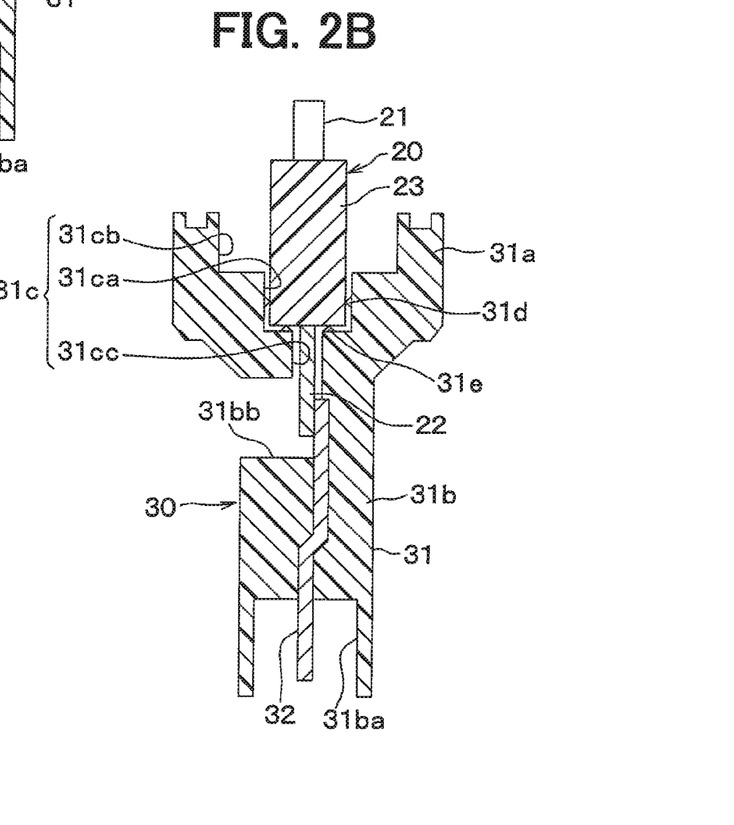
FIG. 2B is a diagram of a cross sectional view illustrating a manufacturing process of the pressure sensor continued from FIG. 2A.

First, as shown in FIG. 2A, the connector case 30 formed by inserting the terminal 32 into the resin case 31 is prepared. At this time, the other end of the terminal 32 is exposed from the second opening 31*bb*. Subsequently, as shown in FIG. 2B, the mold member 20 is prepared. A part of the mold member 20 is fitted into the first opening 31*c* such that the lead portion 22 is inserted from the inlet portion 31*cb* and the mold resin 23 is in contact with the protrusion portion 31*d* and the protrusion portion 31*e* in the intermediate portion 31*ca*.

Figure 2C:
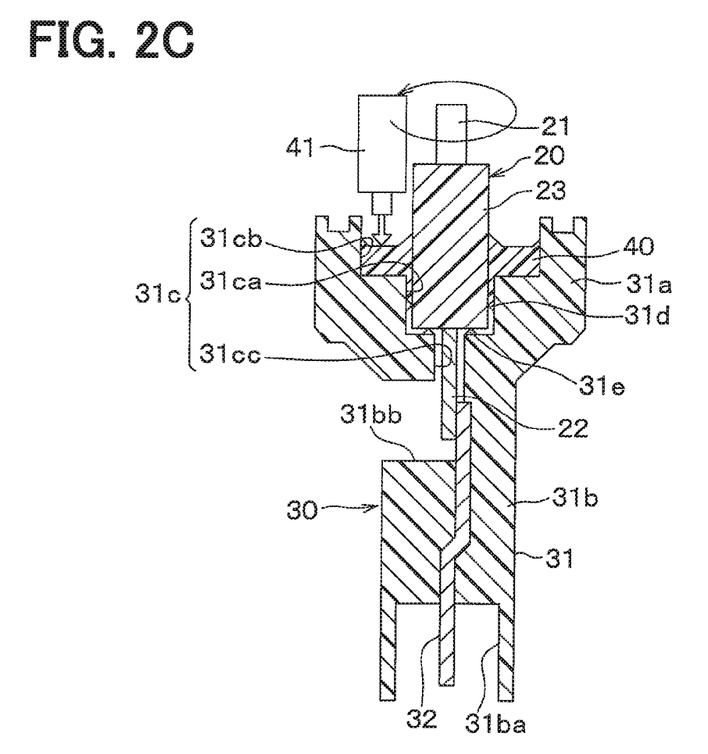
FIG. 2C is a diagram of a cross sectional view illustrating a manufacturing process of the pressure sensor continued from FIG. 2B.

Next, as shown in FIG. 2C, the connector case 30 is set so that a side of the inlet portion 31*cb* faces upward, and the filler 40 is filled by using a filling device 41 for filling with a thermosetting resin or the like. At this time, by rotating the connector case 30 around the central axis, it is possible to fill the filler 40 uniformly over the entire area of the inlet portion 31*cb*. Then, preferably, the filler 40 is filled in the intermediate portion 31*ca* until it enters between the resin case 31 and the mold resin 23. Although the filling depth of the filler 40 at this time is arbitrary, in the present embodiment, the filling depth is up to the position of the protrusion portion 31*d*. Then, the filler 40 is cured by the heat treatment or the like.

When the filler 40 is filled in this way, since the first opening 31*c* communicates with the second opening 31*bb* and the first opening 31*c* is not formed as a sealed space, the filler 40 can be easily filled. Even if bubbles are present in the filler 40, it is possible to escape from the side of the second opening 31*bb*. Therefore, it is unnecessary to perform vacuum defoaming for removing air bubbles after filling the filler 40, and productivity can be increased.

Figure 2D:
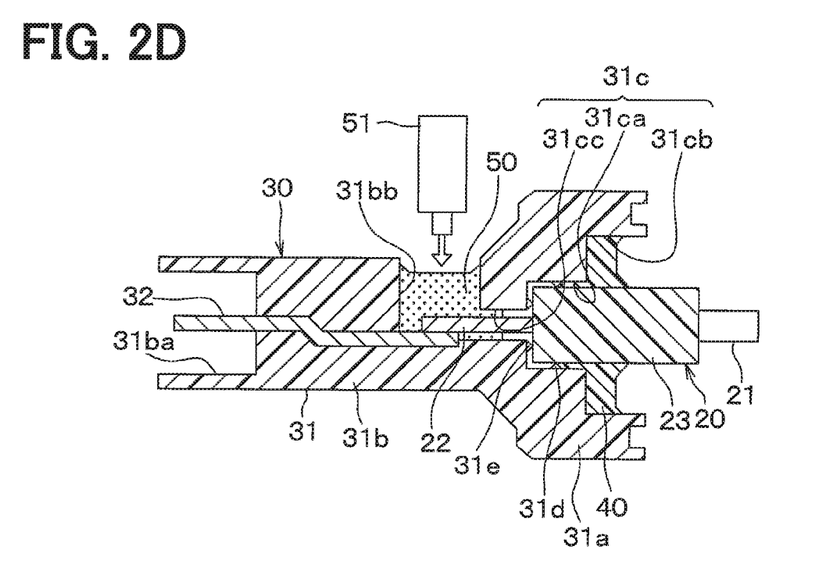
FIG. 2D is a diagram of a cross sectional view illustrating a manufacturing process of the pressure sensor continued from FIG. 2C.

Thereafter, the lead portion 22 and the terminal 32 are physically and electrically connected by welding or the like through the second opening 31*bb*. Further, as shown in FIG. 2D, the connector case 30 and the mold member 20 are installed horizontally, that is, so that a side of the second opening 31*bb* faces upward, and a filling device 51 for filling with a moisture-proof material or the like fills the filler 50 into the second opening 31*bb*. This makes it possible to close the side of the second opening 31*bb* with the filler 50. When the filler 50 is made of a silicone resin or the like, the filler 50 is hardened by drying it or the like.

Figure 2E:
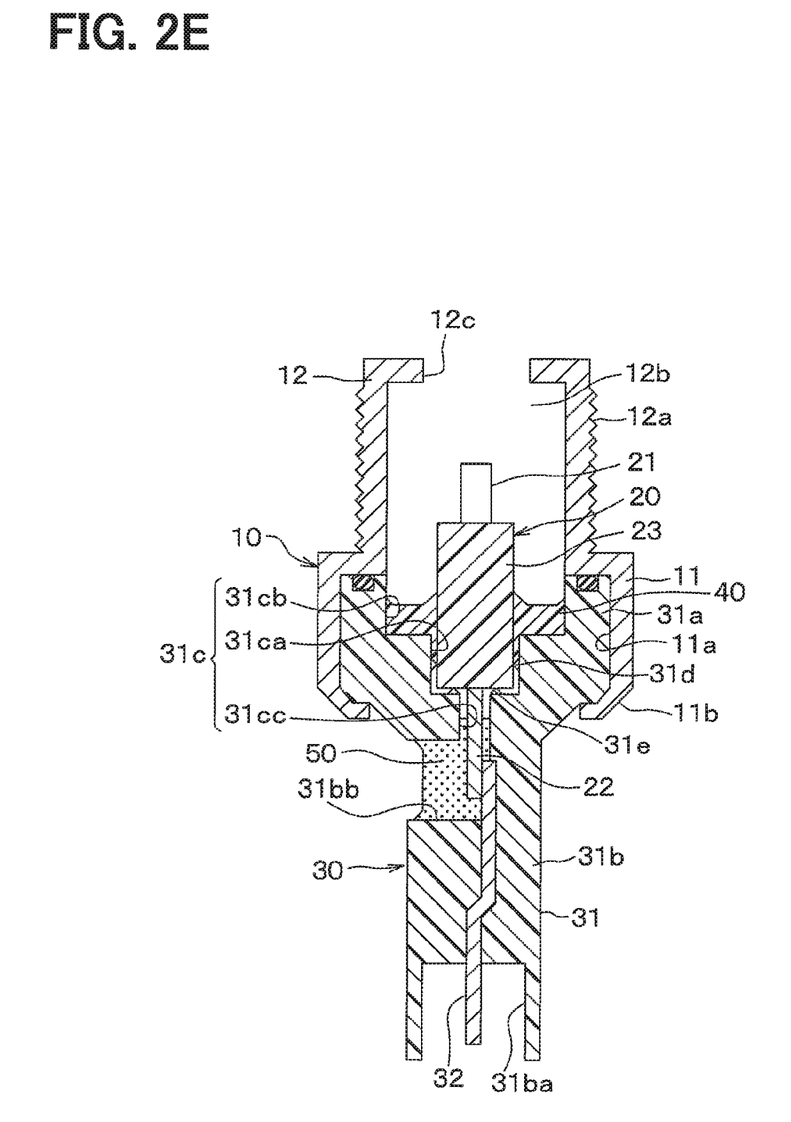
FIG. 2E is a diagram of a cross sectional view illustrating a manufacturing process of the pressure sensor continued from FIG. 2D.

In this way, while the lead portion 22 and the terminal 32 are connected, the mold member 20 is assembled to the connector case 30. Then, as shown in FIG. 2E, the housing 10 is prepared, and the connector case 30 and the mold member 20 are inserted into the accommodation recess 11*a* of the main body portion 11 from the tip of the side of the mold member 20. Specifically, the body portion 31*a* is fitted into the accommodation recess 11*a*. In this state, the connector case 30, the mold member 20, and the like are assembled to the housing 10 by caulking one end 11*b* of the main body portion 11.

Figure 2F:
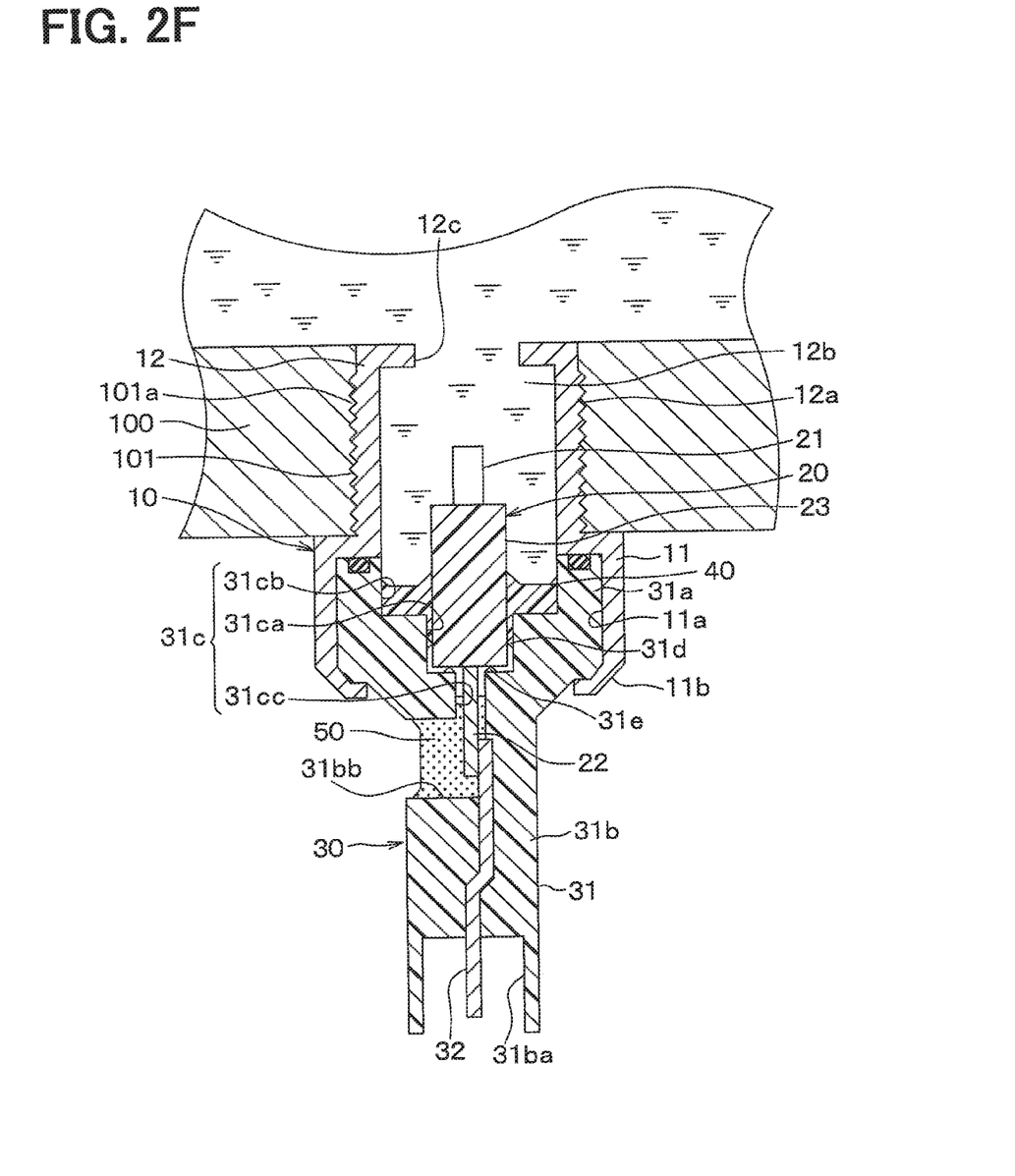
FIG. 2F is a diagram of a cross sectional view illustrating a manufacturing process of the pressure sensor continued from FIG. 2E.

As mentioned above, the pressure sensor is manufactured. The manufactured pressure sensor is attached to a penetration hole 101 formed on the wall surface 100 of the combustion chamber in the engine which is the member to be mounted as shown in FIG. 2F, for example. A female thread 101*a* is formed on the inner surface of the penetration hole 101. The thread groove 12*a* formed on the pipe portion 12 couples threadedly the female thread 101*a* such that the pressure sensor can be attached to the wall surface 100.

As described above, in the pressure sensor of the present embodiment, the mold member 20 is not integrated to the resin case 31 by being insert-molded, but instead, the filler 40 is filled into the first opening 31c while the mold member 20 is arranged in the first opening 31c formed in the resin case 31, and the resin case 31 and the mold member 20 are integrated. Therefore, it is possible to suppress the peeling between the mold member 20 and the resin case 31 due to the thermal cycle, and it is possible to suppress the leakage of the measurement medium to the outside through the gap between the mold member 20 and the resin case 31.

In particular, in the case where there is a difference in the coefficient of linear expansion between the constituent material of the mold resin 23 in the mold member 20 and the constituent material of the resin case 31, in the structure in which the mold member 20 is insert-molded directly to the resin case 31, the peeling between them is likely to occur. Therefore, regarding the case when there is a difference in linear expansion coefficient between the constituent material of the mold resin 23 of the mold member 20 and the constituent material of the resin case 31, it is effective to apply the structure of the present embodiment.

The coefficient of linear expansion of the filler 40 filled between the mold member 20 and the resin case 31 is made to be the linear expansion coefficient similar to the linear expansion coefficient of the constituent material of the mold resin 23. By configuring the filler 40 using such a material having a linear expansion coefficient, the thermal stress between the filler 40 and the mold resin 23 and between the filler 40 and the resin case 31 can be reduced. Therefore, it is possible to suppress the peeling between these components in the thermal cycle.

Other Embodiment

Although the present disclosure has been described in accordance with the embodiments described above, the present disclosure is not limited to the embodiment, but includes various modifications and modifications within the equivalent scope. In addition, various combinations and forms, as well as other combinations and forms including only one element, more than one, or less, in them are also within the scope and idea of the present disclosure.

For example, the above-described constituent materials such as the mold resin 23, the resin case 31, the fillers 40, 50 and the like are merely shown as an example, and other components may be constituted by using other materials.

In addition, protrusion portions 31d and 31e are provided to secure a gap between the mold resin 23 and the resin case 31. The structures of the protrusion portions 31d and 31e shown in the first embodiment are merely examples, and other structures may be used. The structure for securing the gap between the mold resin 23 and the resin case 31 is not limited to the protrusion portions 31d and 31e, but may be a structure in which a groove is provided on the inner wall surface of the first opening 31c in the resin case 31.

Figure 3:
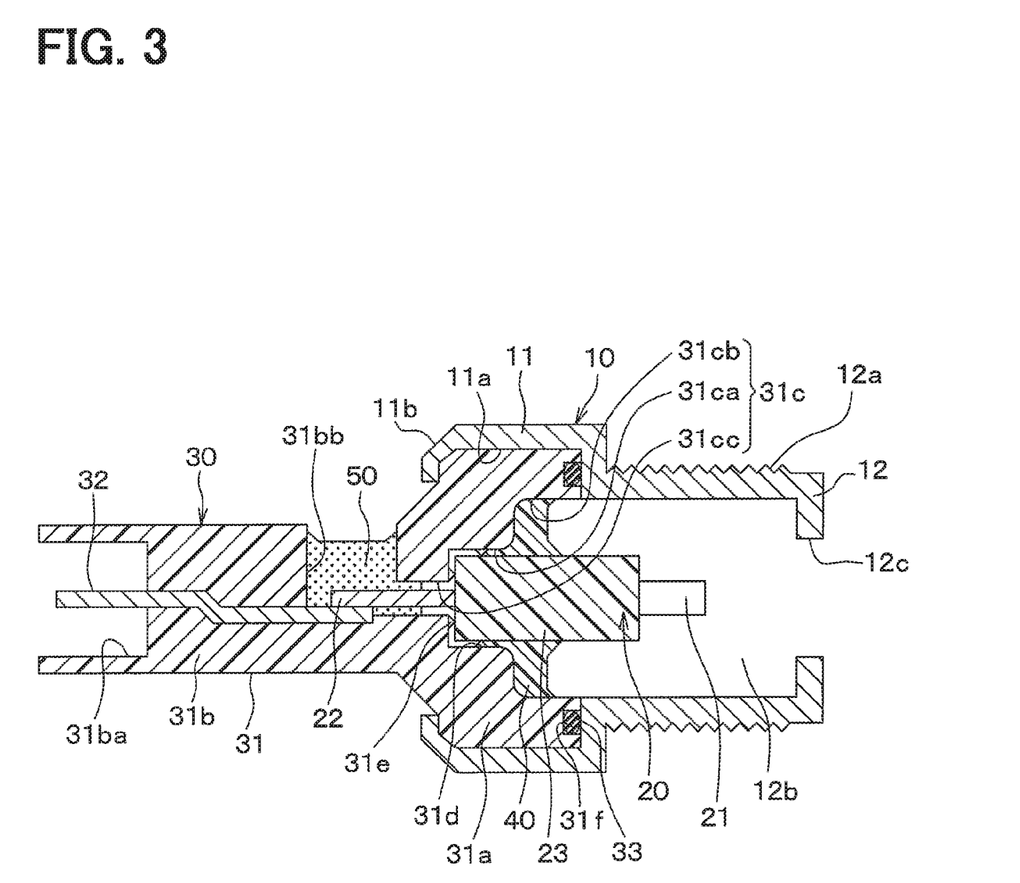
FIG. 3 is a diagram of a cross sectional view of a pressure sensor in other embodiment.

Further, the shape of each part such as the housing 10 and the resin case 31 is merely an example, and other shapes may be used. For example, although the connector portion 31b has a cylindrical shape, it may be a structure other than a cylindrical shape. Further, as shown in FIG. 3, the shape of the inner wall surface of the first opening 31c formed in the resin case 31 may be changed. That is, the boundary position between the intermediate portion 31ca and the inlet portion 31cb may be formed in a rounded R shape. By adopting such a shape, it is possible to improve the filling property of the filler 40 and further to restrain bubbles from remaining at the boundary position.

In the above embodiment, the pressure sensor has been described as an example of a physical quantity sensor, but the same structure as in the above embodiment can be applied to other physical quantity sensors such as a flow sensor and a humidity sensor.

The invention claimed is:

1. A physical quantity sensor, comprising:
   a connector case including a terminal made of a conductive material around a resin case, wherein the resin case has a first opening formed on one surface, a second opening exposing a part of the terminal while communicating with the first opening, and a resin case is integrated with the terminal;
   a mold member including a sensor chip provided with a sensor element that detects a physical quantity, a lead portion being electrically connected to the sensor chip, and being connected to the terminal at the second opening, and a mold resin configured to cover the lead portion and the sensor chip in a state that a part of the lead portion and a part of the sensor chip are exposed, wherein at least part of the lead portion and the mold resin is disposed at the first opening;
   a first filler being filled between the resin case and the mold resin in the first opening; and
   a second filler being filled in the second opening.

2. The physical quantity sensor according to claim 1, wherein
   the first filler is made of an insulating material and a constituent material of the first filler is a material whose linear expansion coefficient is a value similar to the linear expansion coefficient of the mold resin.

3. The physical quantity sensor according to claim 1, wherein
   the resin case is made of a thermoplastic resin, and
   the mold resin and the first filler are made of a thermosetting resin.

4. The physical quantity sensor according to claim 1, wherein
   a plurality of protrusion portions abutting against the outer wall surface of the mold resin are formed on the inner wall surface of the first opening so as to form a gap between the mold resin and the resin case by the plurality of protrusion portions.

5. The physical quantity sensor according to claim 1, wherein
   a second filler is made of a moisture-proof material.

6. The physical quantity sensor according to claim 1, further comprising:
   a housing having an accommodation recess in which a part in at least a part of the resin case and a part of the sensor chip which is exposed from the molding member is accommodated, and an introduction chamber for introducing a measurement medium of the physical quantity to the sensor chip, wherein
   the second opening is disposed outside the housing in the resin case.

7. A method for manufacturing a physical quantity sensor, comprising:
   providing a connector case including a terminal made of a conductive material and a resin case, wherein the resin case has a first opening formed on one surface, a second opening exposing a part of the terminal while communicating with the first opening, and a resin case is integrated with the terminal;

providing a mold member including a sensor chip provided with a sensor element that detects a physical quantity, a lead portion being electrically connected to the sensor chip, and being connected to the terminal at the second opening, and a mold resin configured to cover the lead portion and the sensor chip in a state that a part of the lead portion and a part of the sensor chip are exposed;

disposing at least part of the lead portion and the mold resin at the first opening;

connecting the terminal and the lead portion through the second opening;

filling a first filler between the resin case and the mold resin in the first opening; and connecting the terminal and the lead portion, and filling a second filler through the second opening after the first filler is filled.

8. The physical quantity sensor according to claim 2, wherein the resin case is made of a thermoplastic resin, and the mold resin and the first filler are made of a thermosetting resin.

\* \* \* \* \*